United States Patent [19]

Smith

[11] Patent Number: 4,684,230

[45] Date of Patent: Aug. 4, 1987

[54] COLLAR FOR RETAINING CAMERA BRACKET MOUNT IN PLACE

[76] Inventor: Steven A. Smith, 5329 Michaele La., Minnetonka, Minn. 55345

[21] Appl. No.: 917,216

[22] Filed: Oct. 9, 1986

[51] Int. Cl.⁴ .............................................. G03B 17/00
[52] U.S. Cl. ..................................................... 354/293
[58] Field of Search .................................. 354/80–82, 354/292–294

[56] References Cited

U.S. PATENT DOCUMENTS

| 2,599,269 | 6/1952 | Markle | 354/80 |
| 2,709,560 | 5/1955 | Resk | 354/293 X |

FOREIGN PATENT DOCUMENTS

| 1107848 | 8/1955 | France | 354/293 |
| 1150618 | 8/1957 | France | 354/293 |
| 1305005 | 8/1962 | France | 354/293 |

*Primary Examiner*—Donald A. Griffin
*Attorney, Agent, or Firm*—Orrin M. Haugen; Thomas J. Nikolai; Frederick W. Niebuhr

[57] ABSTRACT

A camera support collar or ring for releasable attachment to the upright post of a photographic camera assembly support which includes a clamping means with an adjustable collar made up of first and second semi-circular segments with a threaded screw means secured to one of the segments for releasably holding the segments in post-gripping disposition at a predetermined elevation on the camera receiving post. A radially extending housing extends outwardly of one of the semi-circular segments and releasably retains a camera position locking pin therein, with the locking pin being arranged for axial movement to an elevation above the upper surface of the collar for engagement with a camera assembly mounted upon the upright post above the upper surface of the adjustable collar, thereby permitting the user to reposition the camera assembly following movement from a prescribed or desired position.

3 Claims, 6 Drawing Figures

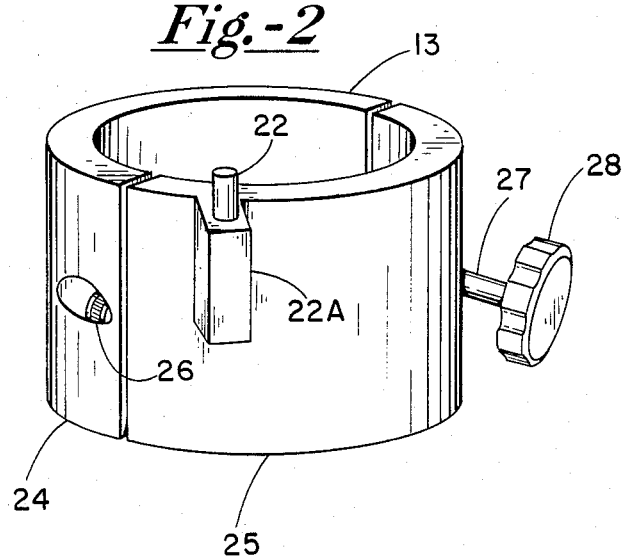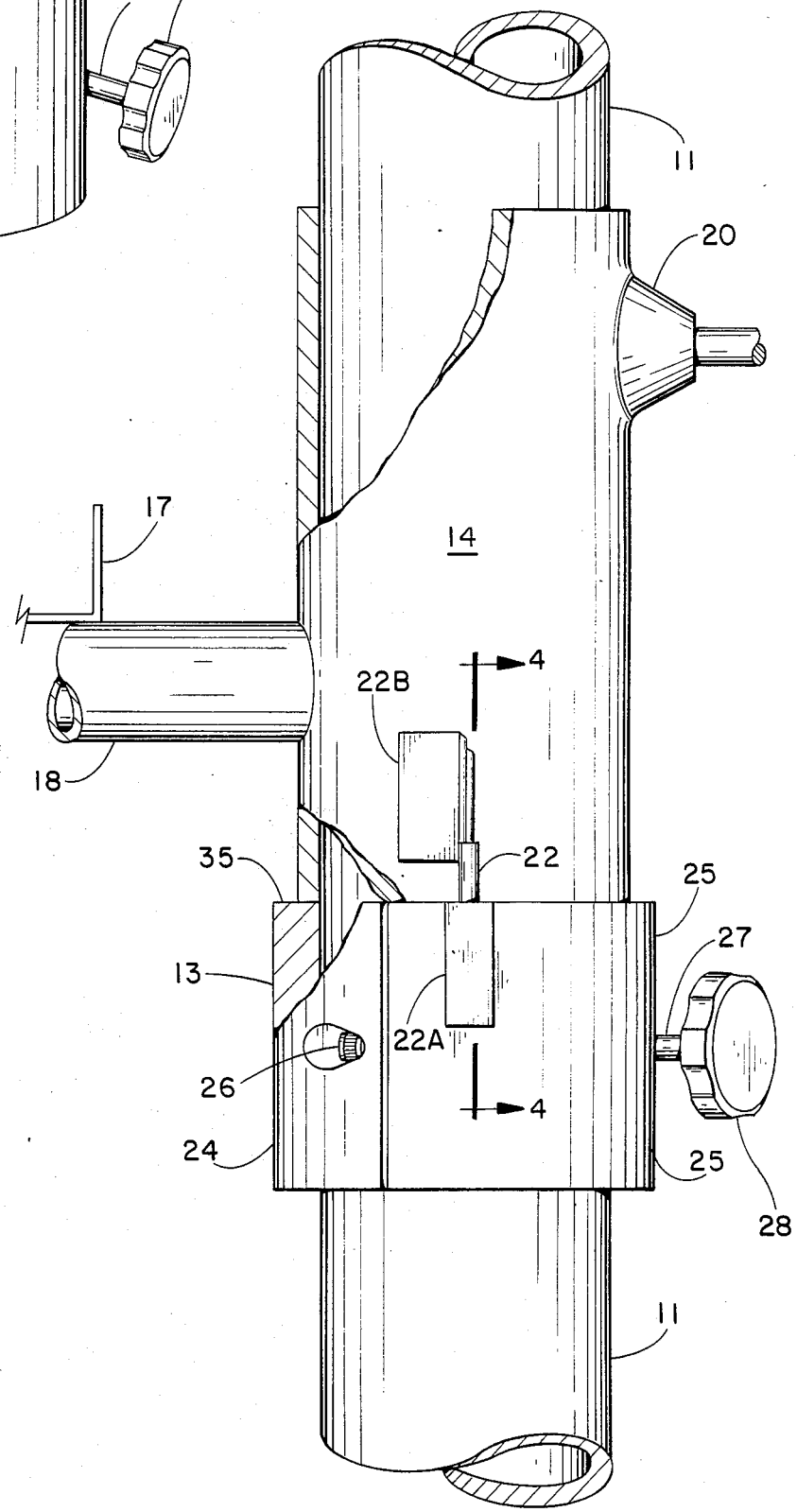

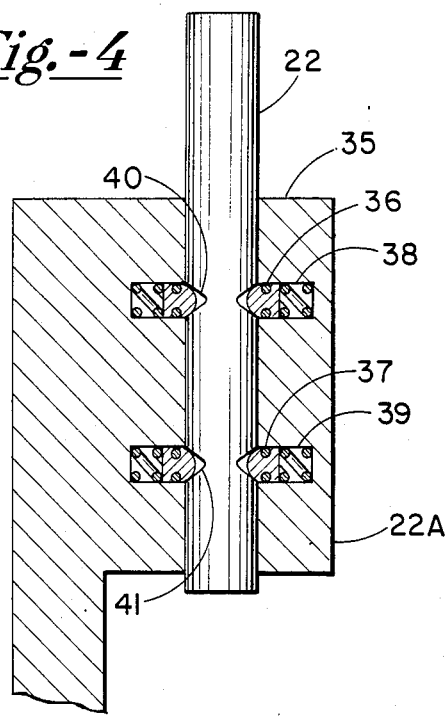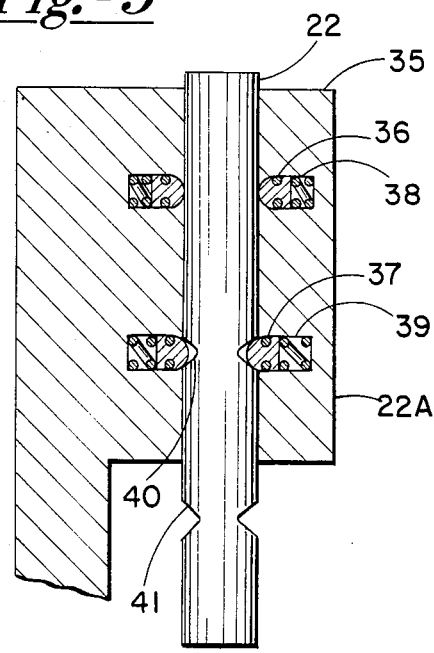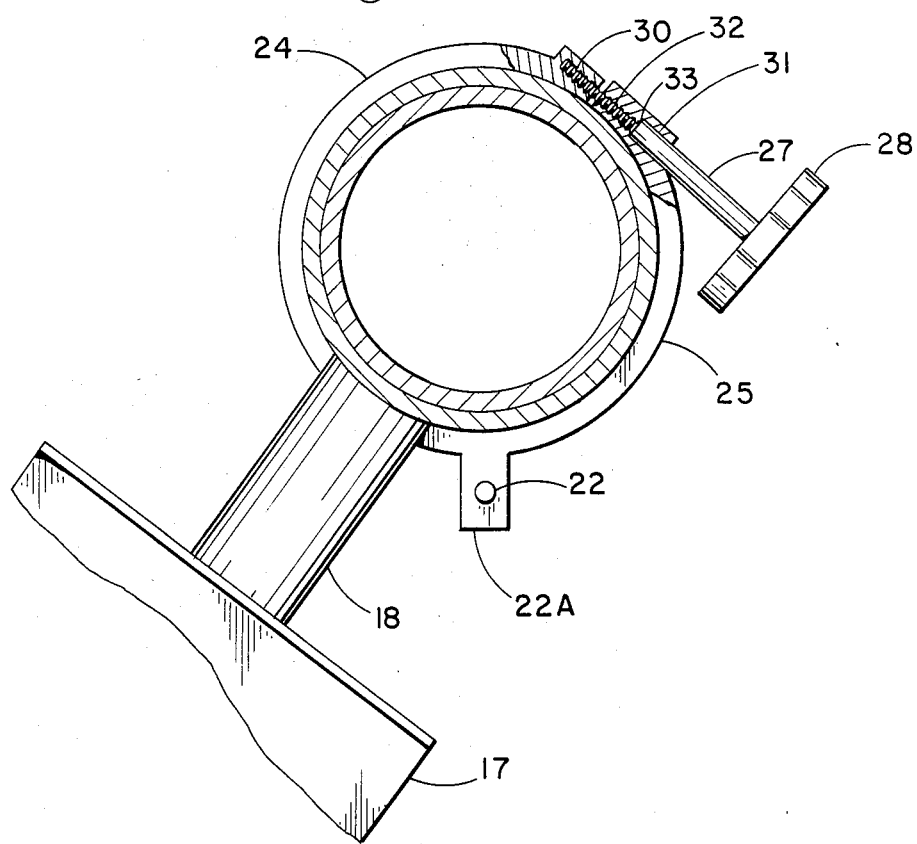

COLLAR FOR RETAINING CAMERA BRACKET MOUNT IN PLACE

BACKGROUND OF THE INVENTION

The present invention relates to a locking collar for retaining a photographic camera assembly in a desired position, and provides means for conveniently moving, removing, or repositioning the camera in a previously utilized position.

In taking a series of photographs, a photographer is frequently called upon to reposition a camera in order to take additional exposures. Typically, the photographer will utilize a tripod or other upright support for the camera, with the camera itself normally being mounted on a bracket extending radially from the tripod post. Frequently, during taking of a series of exposures or shots, the photographer will move the camera only to find it necessary to return the camera to a previously utilized position.

In such instances, it becomes desirable, if not essential, to reposition the camera in the previously utilized location. Such repositioning requires both axial and arcuate dispositions be the same as previously utilized. While locking brackets or clamps have been available to control the elevation, convenient arcuate repositioning has frequently been a problem.

SUMMARY OF THE INVENTION

In accordance with the present invention, a collar arrangement is provided which may be releasably mounted or secured to the support post, with the collar further including a retractable pin which may be extended outwardly from the collar in order to provide an arcuate position indication. Since the pin is movable axially, it may be retracted into the locking collar in a fashion to permit free arcuate movement of the camera assembly, and may also be conveniently repositioned so as to extend outwardly and make contact with the camera assembly when desired for position reference purposes.

Briefly, the collar-clamping means of the present invention includes an adjustable collar having first and second semi-circular segments which are releasably held together by a threaded screw means. When the screw means is tightened, the segments are maintained in post-gripping disposition along their inner circumferences so as to establish the predetermined elevation of the clamping means. Additionally, one of the semi-circular segments is provided with an axially movable pin, with the movable pin being conveniently located at a position radially outwardly of the semi-circular segments. When extended, the pin provides an arcuate reference point to enable the photographer to reposition a camera in a previously predetermined arcuate position. Since the threaded screw means provides an arrangement for releasably holding the semi-circular segments together, a modest force being applied to the semi-circular segments will permit the photographer to adjustably position the clamping means on the upright post at any desired position thereon.

Therefore, it is a primary object of the present invention to provide an improved clamping means for use with a photographic camera assembly, wherein the clamping means may be conveniently releasably attached to a support post system for a camera assembly, with means being provided for both elevational and arcuate repositioning of the camera assembly.

It is a further object of the present invention to provide an improved clamping means for positioning a photographic camera assembly in desired elevation and arcuate disposition, and with the clamping means having arrangements coupled thereto for releasably locking the clamping means in predetermined position on an upright photographic support post.

Other and further objects of the present invention will become apparent to those skilled in the art upon a study of the following specification, appended claims, and accompanying drawings.

IN THE DRAWINGS

FIG. 2 is a detail perspective view of the camera support collar of the present invention, with FIG. 2 being shown on a slightly enlarged scale;

FIG. 3 is a detail elevational view of the camera support collar shown in FIG. 1, and with the collar being shown supporting a camera assembly thereabove;

FIG. 4 is a detail elevational view taken along the line and in the direction of the arrows 4—4 of FIG. 3, with FIG. 4 illustrating the camera position locking pin in extended position;

FIG. 5 is a view similar to FIG. 4, and illustrating the camera position locking pin in retracted disposition; and FIG. 6 is a horizontal sectional view of the arrangement taken along and through the camera receiving post immediately above the camera support collar.

DESCRIPTION OF THE PREFERRED EMBODIMENT

Figure 1:
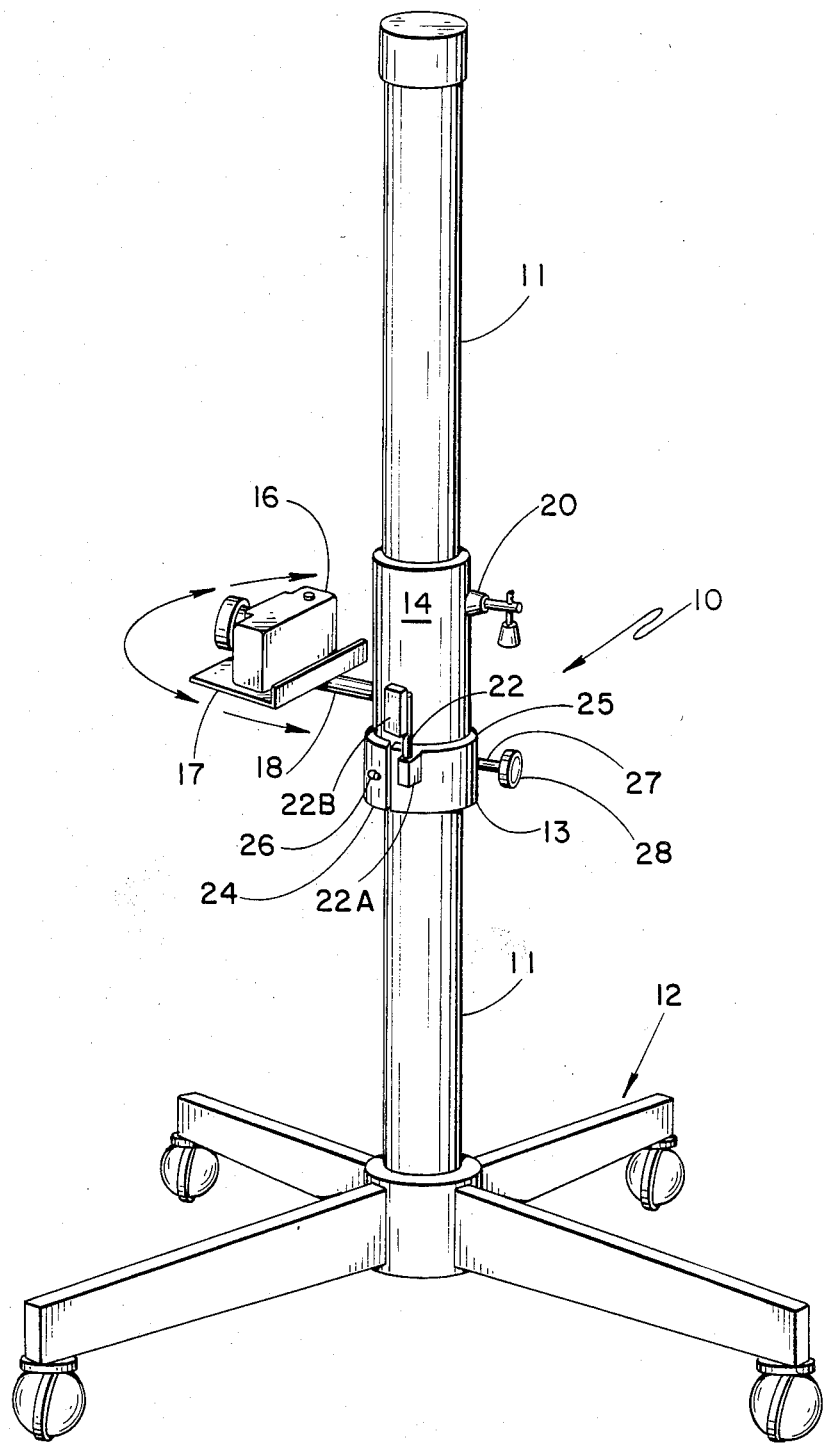
FIG. 1 is a perspective view of a photographic assembly, and showing the camera support collar or ring of the present invention in operative disposition on a photographic post, and further illustrating a camera assembly disposed immediately thereabove.

With attention being directed to the drawings, and particularly to FIG. 1, the photographic assembly generally designated 10 includes an upright or camera receiving support post 11 which is mounted upon a movable support assembly generally shown at 12. The camera support collar or ring of the present invention is shown at 13, with a photographic camera assembly being operatively supported thereon, with the photographic camera assembly being shown generally at 14. The photographic camera assembly includes a camera shown at 16, the camera being mounted on a bracket or pad 17 which is secured, in turn, to radially extending arm 18. Sleeve 19 is positioned and/or received over post 11, with sleeve 19 being provided with a threaded locking member 20 for locking engagement with the outer circumference or outer peripheral surface of camera receiving support post 11. Radially extending abutment pad 21 is shown in operative contact with the camera position locking pin 22 of the camera support collar assembly 13.

With attention being directed to FIG. 2 of the drawings, camera support collar or ring 13 includes first and second semi-circular segments 24 and 25, with these segments being secured together in part by threaded cap screw 26 which is engaged in a blind bore in semi-circular segment 25. Further, a threaded screw means as at 27 engages a blind bore within segment 24 so as to provide a releasable clamping engagement between segments 24 and 25. Threaded screw 27 is provided with a knurled knob as at 28 to assist in rotational motion of screw 27. As is conventional, the bore formed in semi-circular segment 24 to accommodate member 26 is not threaded, and a similar bore, not shown, is formed in semi-circular segment 25 to accommodate threaded member 27. Threaded member 27, as is conventional, is provided with a means for holding segments 24 and 25 in clamped engagement, one with the other.

With attention being directed to FIG. 6, it will be observed that the threaded bore portion 30 formed in semi-circular segment 24 receives the threaded end of screw 27 therewithin. Within semi-circular segment 25, however, bore 31 is provided along with counterbore segment 32 to accommodate threaded screw member 27, and to provide an annular abutment ring as at 33 to provide the clamping force between semi-circular segments 24 and 25. Such clamping means are, of course, conventional in the art.

The utilization of the apparatus is illustrated in particularity in FIGS. 1 and 3 of the drawings. Specifically, the clamping means 13 is initially positioned loosely on the camera receiving post 11, with the assembly 14 thereafter being positioned upon the assembly 13. With the photographic camera at its desired elevation and at its desired arcuate disposition, knurled knob 28 is rotated so as to clamp semi-circular segments 24 and 25 into position. Camera position locking pin 22 is then extended from housing 22A so as to make contact with radially extending lug or ear 22B, with lug 22B being fixedly positioned on sleeve portion of photographic camera assembly 14. In the event a camera retaining system is provided which is not equipped with a lug or ear such as lug 22B, then, and in that event, contact may be made between radially extending arm 18 and locking pin 22. For most commercially available camera securing or mounting devices, a radially extending member is provided either in the form of a lug such as lug 22B, or, more conventionally, radially extending arm 18.

With the camera in position, in the manner illustrated in FIG. 3, the photographer is free to take the shots or exposures desired, and may, if necessary, move the camera from the position illustrated in FIG. 3 and be free to rely upon its being repositioned in the same location at a later point in time, with both elevational and arcuate dispositions being retained. As is illustrated in FIG. 3, the upper annular surface 35 of semi-circular segments 24 and 25 provides the elevational support for member 14.

In this manner, therefore, the camera support collar or ring of the present invention functions to preserve both elevational and arcuate dispositions of a photographic camera assembly so as to enable the photographer freedom and flexibility in certain of his normal photographic operations or activities.

With attention being directed to FIGS. 4 and 5 of the drawings, pin 22 is retained within housing 22A, and arranged for axial slidable motion therewithin. Pin 22 is provided with means for frictionally holding the pin in desired disposition. Among the means which may be provided are those illustrated in FIGS. 4 and 5, including a pair of "O" rings 36 and 37 held in place within annular bores 38 and 39 respectively. With continued reference being made to FIGS. 4 and 5, the pin 22 is provided with annular recesses as at 40 and 41 so as to provide a mating recess for "O" rings 36 and 37. While the structure illustrated in FIGS. 4 and 5 show annular grooves being formed within pin 22, it will, of course, be appreciated that in certain designs, sufficient friction may be obtained by simply utilizing a pin member 22 with a straight cylindrical surface, and without the annular grooves.

Typically, the inner diameter of the assembly 13 will match the outer diameter of camera receiving post 11. For most applications, these diameters are matching and will be three inches.

It will be apparent that those skilled in the art may make various modifications of the camera support collar or ring of the present invention without departing from the spirit and scope of the invention.

What is claimed is:

1. In combination with an upright support for a photographic camera assembly, the support having a base means and a camera receiving post extending upwardly therefrom, clamping means for releasable attachment to the post at a predetermined elevation in camera supporting position immediately below a camera mounted on said post; the improvement comprising:

(a) said clamping means including an adjustable collar having first and second semi-circular segments with threaded screw means secured to said first segment and engaging said second segment for releasably holding said first and second segments in post-gripping disposition and at a predetermined elevation on said post; and (b) a radially extending housing extending radially outwardly from one of said semi-circular segments and releasably retaining a camera position locking pin therein, said camera position locking pin being arranged for axial movement to an elevation above the upper surface of said first and second collars within said radially extending housing for engagement with a camera assembly mounted upon said upright post axially adjacent said clamping means, the arrangement being such that said photographic camera assembly is supported by said adjustable collar.

2. The improvement as defined in claim 1 wherein said threaded screw means includes a knurled knob at the proximal end thereof.

3. The improvement as defined in claim 1 being particularly characterized in that frictional detent means are provided for releasably retaining said camera position locking pin in desired axial disposition.

* * * * *